(12) United States Patent
Hirano

(10) Patent No.: US 6,808,226 B2
(45) Date of Patent: Oct. 26, 2004

(54) CONTROL APPARATUS FOR FUEL LID AND SLIDE DOOR

(75) Inventor: Katsumi Hirano, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/660,021

(22) Filed: Sep. 11, 2003

(65) Prior Publication Data
US 2004/0049987 A1 Mar. 18, 2004

(30) Foreign Application Priority Data
Sep. 13, 2002 (JP) .................................. 2002-268381

(51) Int. Cl.[7] .............................................. B62D 25/00
(52) U.S. Cl. .............. 296/155; 296/97.22; 292/DIG. 46
(58) Field of Search .............................. 296/155, 97.22; 292/DIG. 46

(56) References Cited

U.S. PATENT DOCUMENTS 5,906,405 A * 5/1999 Cooper .................... 296/97.22
6,007,141 A * 12/1999 Thomas et al. ............. 296/155

FOREIGN PATENT DOCUMENTS

JP 11115496 A 4/1999

* cited by examiner

Primary Examiner—Joseph D. Pape
(74) Attorney, Agent, or Firm—Rankin, Hill, Porter & Clark LLP

(57) ABSTRACT

First pivot lever is connected to a fuel-lid opening rod, and a sensor is connected to the first pivot lever for detecting a projected state and retracted state of the opening rod. Second pivot lever connected to a slide-door locking member is pressed against the first pivot lever via a tension spring. As the opening rod is retracted by closing movement of the fuel lid, the second pivot lever is pressed by the first pivot lever, while, as the opening rod is projected, the second pivot lever is caused to pivot together with the first moving member by a biasing force of the tension spring.

3 Claims, 13 Drawing Sheets

CONTROL APPARATUS FOR FUEL LID AND SLIDE DOOR

FIELD OF THE INVENTION

The present invention relates to an improved control apparatus for controlling operation of an opening rod that presses open a fuel lid covering a fuel supply opening of a motor vehicle and operation of a lock member for locking a slide door of the vehicle in a closed position.

BACKGROUND OF THE INVENTION

Control apparatus for a fuel lid and slide door in a motor vehicle have been known, for example, from JP-A-11-115496, which includes an opening rod for opening the fuel lid of the vehicle and a lock member for locking the slide door and where the opening rod and the lock member operate in interlocked relation to each other.

FIG. 14 hereof is a side view of a motor vehicle disclosed in JP-A-11-115496, which is provided with the conventional fuel lid/slide door control apparatus. In the motor vehicle 100, the slide door 102 is disposed on a left side 101 of a vehicle body for horizontal sliding movement therealong, and the fuel lid 103 is disposed rearwardly of the slide door 102 for opening/closing movement. If the slide door 102 is moved toward the rear of the vehicle into an open position, the fuel lid 103 would be undesirably hidden behind the slide door 102. Therefore, in the vehicle 100, a locking device 104 is provided to prevent the slide door 103 from being moved manually or by electric power when the fuel lid 103 is in an open position. In order to thus prevent the opening movement of the slide door 102 while the fuel lid 103 is open, it is necessary to control the locking device 104 by means of the control apparatus 105 in response to the opening/closing of the fuel lid 103.

The control apparatus 105 includes an opening rod 106 provided adjacent to the reverse side of the fuel lid 103 for opening the fuel lid 103, and the locking device 104 disposed on a floor 107 of the vehicle 100 for locking the slide door 102 to prevent opening movement of the door 102. The control apparatus 105 controls the opening rod 106 and locking device 104 to operate in interlocked relation to each other. As the control apparatus 105 projects the opening rod 106 rearward to open the fuel lid 103, it shifts the locking device 104 to a locking position so as to prevent opening of the slide door 102 while the fuel lid 103 is open. Conversely, as the control apparatus 105 retracts the opening rod 106 with the fuel lid 103 closed, it shifts the locking device 104 to an unlocking position so as to permit opening of the slide door 102.

The locking device 104 includes a locking member provided adjacent to the floor of the vehicle 100 for interlocked movement with the opening rod 106. Particularly, where the vehicle 100 is used in a cold district, the locking member may sometimes be frozen held in the unlocking position. In case the locking member is frozen held in the unlocking position, the opening rod 106 can not be projected because of its interlocked relation to the locking member. When the locking member is frozen held in the unlocking position, the opening rod can not be projected to open the fuel lid even if the fuel lid 103 has been released from a locked state.

SUMMARY OF THE INVENTION

In view of the foregoing prior art problems, it is an object of the present invention to provide an improved fuel lid/slide door control apparatus which, even when a slide-door locking member is frozen held in an unlocking position, can project an opening rod to open a fuel lid.

In order to accomplish the above-mentioned object, the present invention provides a control apparatus for a fuel lid and slide door (i.e., fuel lid/slide door control apparatus) of the type which includes an opening rod for opening the fuel lid and a locking member for locking the slide door, and in which, when the fuel lid is opened by projecting movement of the opening rod, control is performed to prevent the opening of the slide door by means of the locking member, but, when the opening rod is retracted by closing movement of the fuel lid, control is performed to permit the opening of the slide door by shifting the locking member to an unlocking position. The control apparatus of the invention comprises: a first moving member and second moving member provided between the opening rod and the locking member for interlocked movement with respect to each other, the first moving member being connected to the opening rod, the second moving member being connected to the locking member via a coupler unit, the second moving member being pressed against the first moving member via a resilient member; and a detection section connected to the first moving member for detecting a projected state and retracted state of the opening rod. As the opening rod is retracted by the closing movement of the fuel lid, the second moving member is pressed by the first moving member, connected to the opening rod, to move in a first direction together with the first moving member, while, as the opening rod is projected, the second moving member is caused to move, in a second direction different from the first direction, together with the first moving member by a biasing force of the resilient member.

Even in the case where the locking member is frozen held in the unlocking position to place the second moving member in locked condition, the arrangements of the present invention allow only the first moving member to move so as to project the opening rod. Further, because the first moving member moves together with the opening rod when the rod is projected to open the fuel lid, the detection section, connected to the first moving member, can detect the opening of the fuel lid. Thus, when the fuel lid has been opened with the locking member frozen held in the unlocking position, the opening of the fuel lid can be detected by the detection section.

In an embodiment, the first moving member and second moving member are in the form of a first pivot lever and second pivot lever which are pivotably supported together at their respective proximal ends via a pivot shaft, and the second pivot lever is normally pressed against an engaging piece of the first pivot lever by the biasing force of the resilient member. Because the opening rod and locking member are operatively connected with each other through a simple construction comprising only the two pivot levers and the engaging piece provided on one of the levers, the fuel lid/slide door control apparatus of the invention can be significantly reduced in size and cost. In addition, designing flexibility of the fuel lid/slide door control apparatus can be enhanced.

In one embodiment, the coupler unit has an elongated hole formed in an end portion thereof, and the locking member has a projecting pin fitted in the elongated hole of the coupler unit in such a manner that the coupler unit is movable relative to the locking member in a longitudinal direction of the elongated hole. Thus, the second moving member connected to the locking member via the coupler unit having the elongated hole is movable when the locking member is held in a locking position for locking the slide door. Because the second moving member can be caused to move through a simple construction comprising the coupler unit with the elongated hole, the fuel lid/slide door control apparatus of the invention can be further reduced in size and cost. In addition, the designing flexibility of the fuel lid/slide door control apparatus can be enhanced further.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

In the following description, the terms "front", "rear", "left" and "right" are used to refer to directions as viewed from a human operator or driver of a motor vehicle.

Figure 1:
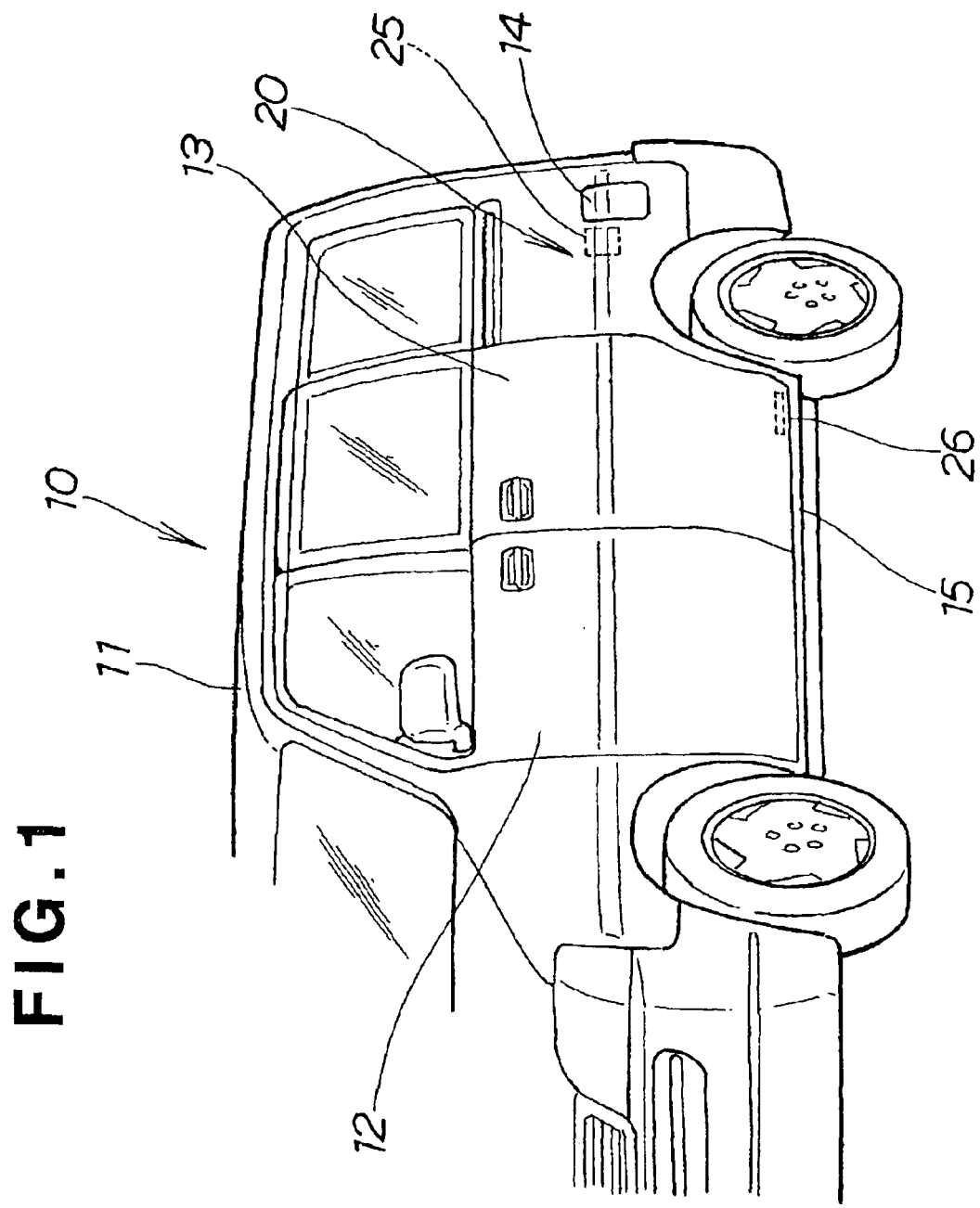
FIG. 1 is a front perspective view of a vehicle including a control apparatus for a fuel lid and slide door.

FIG. 1 is a front perspective view of the vehicle provided with a control apparatus for a fuel lid and slide door (i.e., fuel lid/slide door control apparatus) when the slide door is in the closed position.

The vehicle 10 includes a front side door 12 provided on a side (left side in the illustrated example) of a vehicle body 11, a side slide door 13 provided on the side rearwardly of the front side door 12, a fuel lid 14 provided on the side rearwardly of the slide door 13, and a fuel lid/slide door control apparatus 20 of the present invention.

The slide door 13 is openable and closeable by being slid, manually or by electric power, in a front-and-rear direction along the left side of the vehicle body 11. Namely, when the slide door 13 is in the closed position, the slide door 13 can be opened by being slid toward the rear of the vehicle body 11 manually or by electric power. Conversely, when the slide door 13 is in the open position, the slide door 13 can be closed by being slid toward the front of the vehicle body 11 manually or by electric power.

The fuel lid/slide door control apparatus 20 includes an opening rod 21 (FIG. 3) provided adjacent to the reverse side (inner surface) of the fuel lid 14 for opening the fuel lid 14, and a locking member 22 (FIG. 3) provided adjacent to a floor 15 of the vehicle 10 for locking the slide door 13 to prevent opening movement of the door 13.

Figure 2:
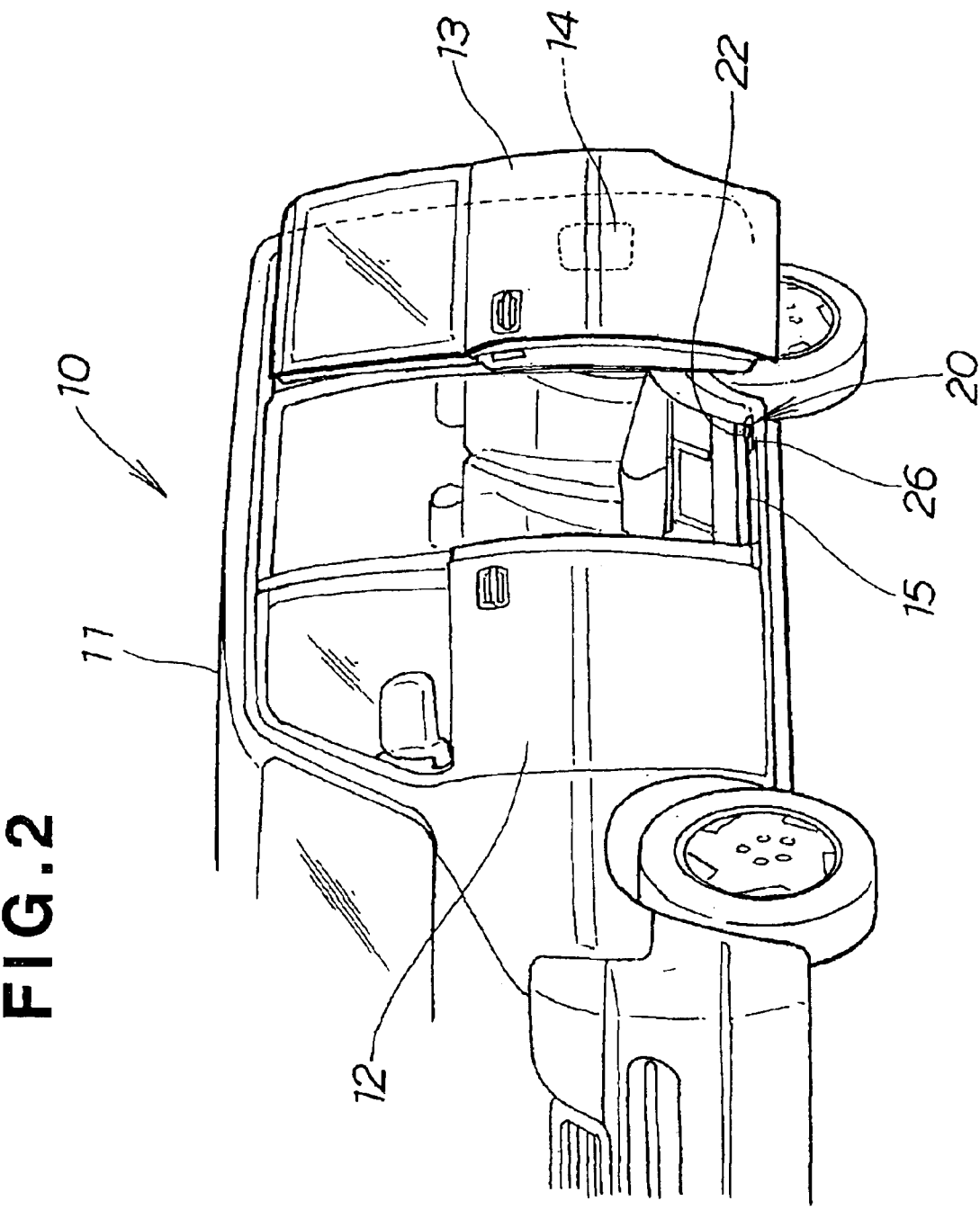
FIG. 2 is a front perspective view of the vehicle with the fuel lid/slide door control apparatus when the slide door is in an open position.

FIG. 2 is a front perspective view of the vehicle 10 including the fuel lid/slide door control apparatus 20 when the slide door is in the open position.

As the slide door 13 is opened by being slid toward the rear of the vehicle body 11, the fuel lid 14 would be undesirably hidden behind the slide door 13. To avoid this, when the fuel lid 14 is open, the fuel lid/slide door control apparatus 20 controls the locking member 22 (see also FIG. 4) to lock (i.e. prevent opening movement of) the slide door 13, while, when the fuel lid 14 is closed, the fuel lid/slide door control apparatus 20 controls the locking member 22 to allow the slide door 13 to be slid in the rearward direction of the vehicle body 11 into the open position as shown in the figure.

Figure 3:
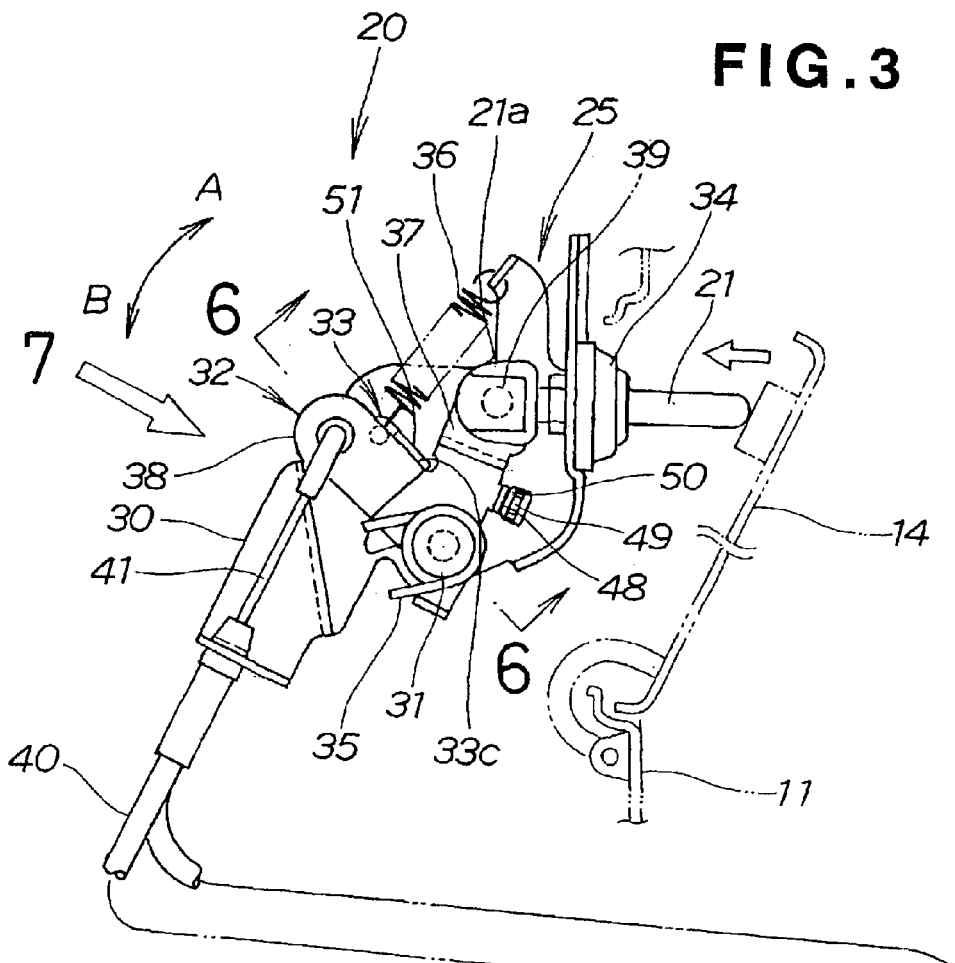
FIG. 3 is a schematic view explanatory of the fuel lid/slide door control apparatus of the present invention.
Figure 3:
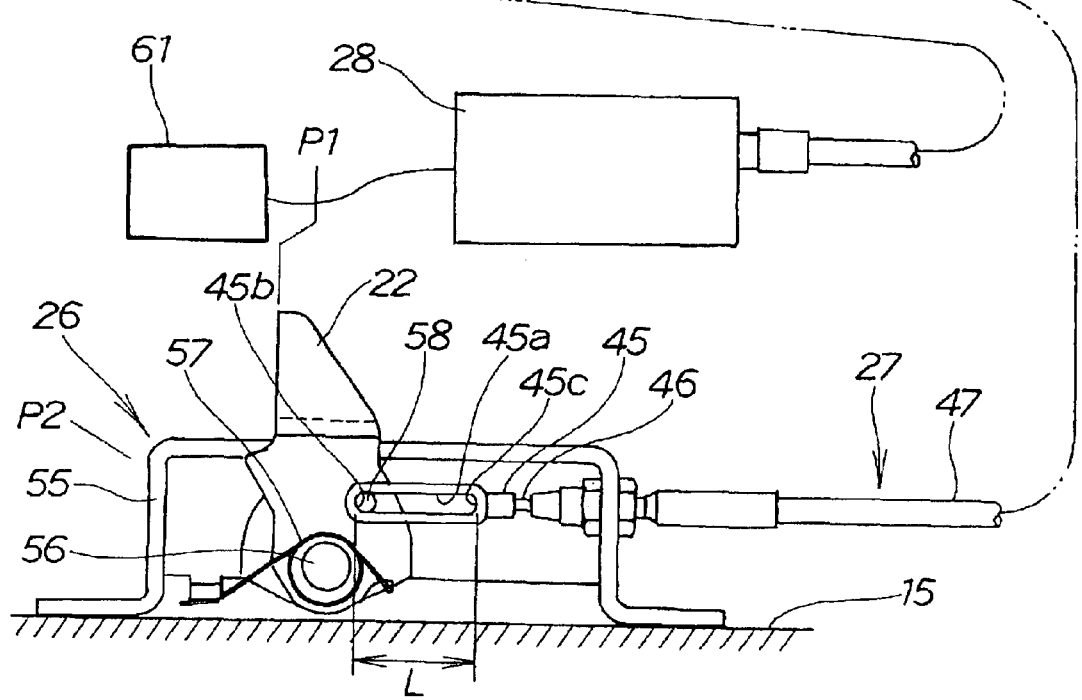

The following paragraphs give details of the fuel lid/slide door control apparatus 20. FIG. 3 is a schematic view explanatory of the fuel lid/slide door control apparatus 20 of the present invention.

The fuel lid/slide door control apparatus 20 includes an opening rod mechanism 25 for opening the fuel lid 14, a locking mechanism 26 for locking the side door 13 (FIG. 2) to prevent opening movement of the slide door 13, a coupling mechanism 27 for interconnecting the locking mechanism 26 and opening rod mechanism 25, and a detection section 28 for detecting projected and retracted states of the opening rod 21.

Figure 4:
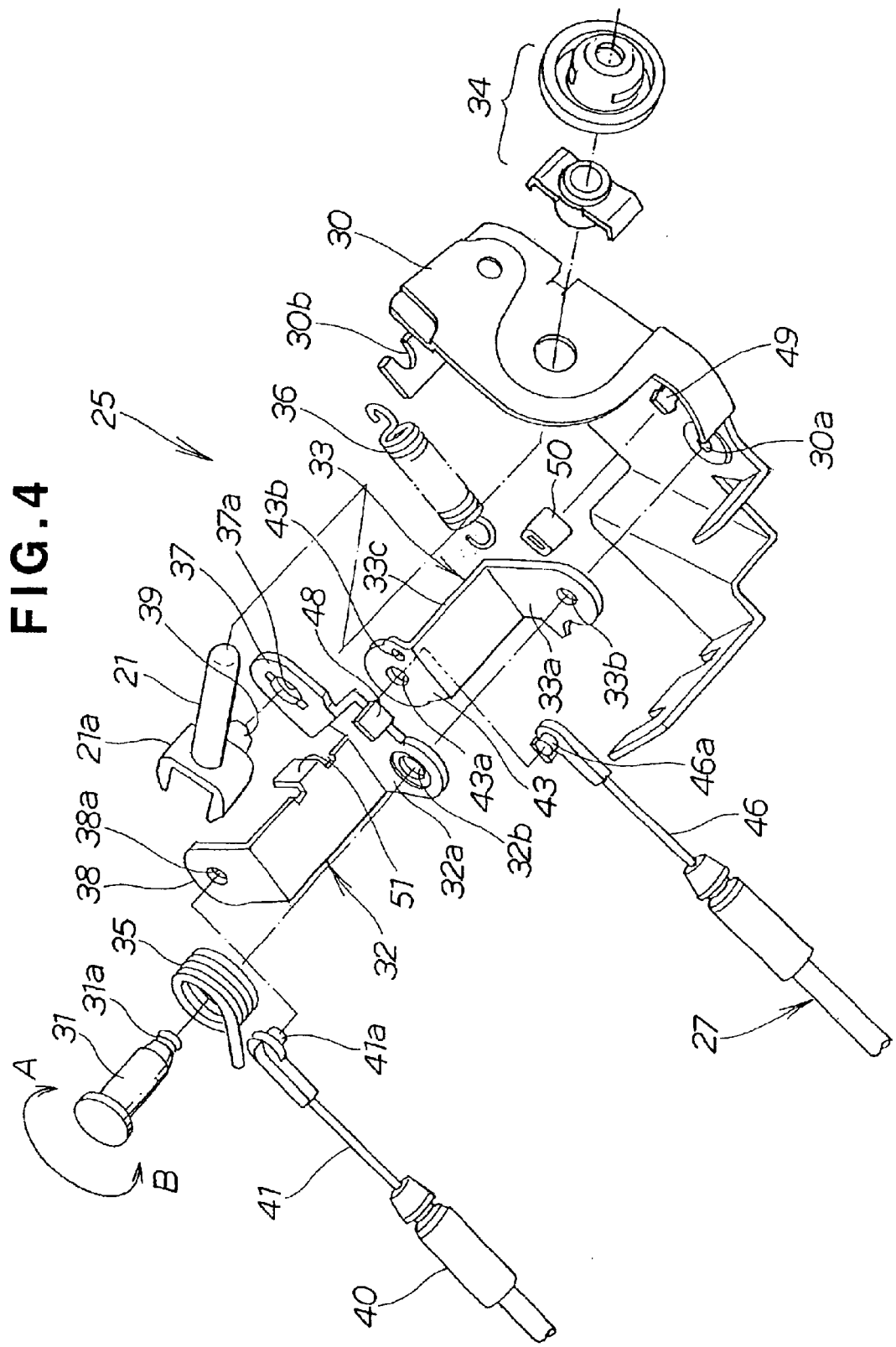
FIG. 4 is an exploded perspective view of an opening rod mechanism in the fuel lid/slide door control apparatus of the invention.

FIG. 4 is an exploded perspective view of the opening rod mechanism 25 in the fuel lid/slide door control apparatus 20.

As shown, the opening rod mechanism 25 includes a bracket 30 secured to the vehicle body 11 (FIG. 1), first and second moving members (in the illustrated example, first and second pivot levers) 32 and 33 pivotably mounted together on the bracket 30 via a pivot shaft 31, and the opening rod 21 connected to the first pivot lever 32. The opening rod mechanism 25 also includes a bearing 34 pivotably bearing the opening rod 21, a coil spring 35 normally urging the first pivot lever 32 in a clockwise direction (i.e., direction of arrow A) of FIG. 4, and a resilient member (e.g., tension spring) 36 normally urging the second pivot lever 33 in the clockwise direction.

The first pivot lever 32 has a mounting hole 32b formed in its proximal end portion 32a, and the second pivot lever 33 has a mounting hole 33b formed in its proximal end portion 33a. The above-mentioned pivot shaft 31 is inserted through the respective mounting holes 32b and 33b of the first and second pivot levers 32 and 33, and the pivot shaft 31 has a distal end portion 31a mounted in a mounting hole 30a of the bracket 30. In this way, the first and second pivot levers 32 and 33 are pivotably connected to the bracket 30 via the pivot shaft 31.

The first pivot lever 32 has a substantial V-shape as viewed sideways (FIG. 5B), and it has a mounting hole 37a formed in one of two distal end portions 37 and a mounting hole 38a formed in the other distal end portion 38.

The opening rod 21 has a shaft 39 formed on its proximal end portion 21a, and the shaft 39 is mounted in the mounting hole 37a formed in the one distal end portion 37 of the first pivot lever 32; thus, the opening rod 21 is connected at the proximal end portion 21a to the one distal end portion 37. Rear end pin 41a fixed to an inner member 41 of a cable unit 40 is mounted in the mounting hole 38a of the other distal end portion 38 so that the inner member 41 is connected to the other distal end portion 38. In this way, the cable unit 40 couples the other distal end portion 38 of the first pivot lever 32 to the detection section 28 of FIG. 3; that is, the detection section 28 is connected to the first pivot lever 32 via the cable unit 40.

The second pivot lever 33 has a mounting hole 43a formed in its distal end portion 43, and a rear end pin 46a of an inner member 46 of a coupling unit (i.e., coupling cable unit) 27 is mounted in the mounting hole 43a so that the inner member 46 is connected to the distal end portion 43 of the second pivot lever 33. In this way, the coupling cable unit 27 interconnects the opening rod mechanism 25 and locking mechanism 26 (FIG. 3).

Figure 5A:
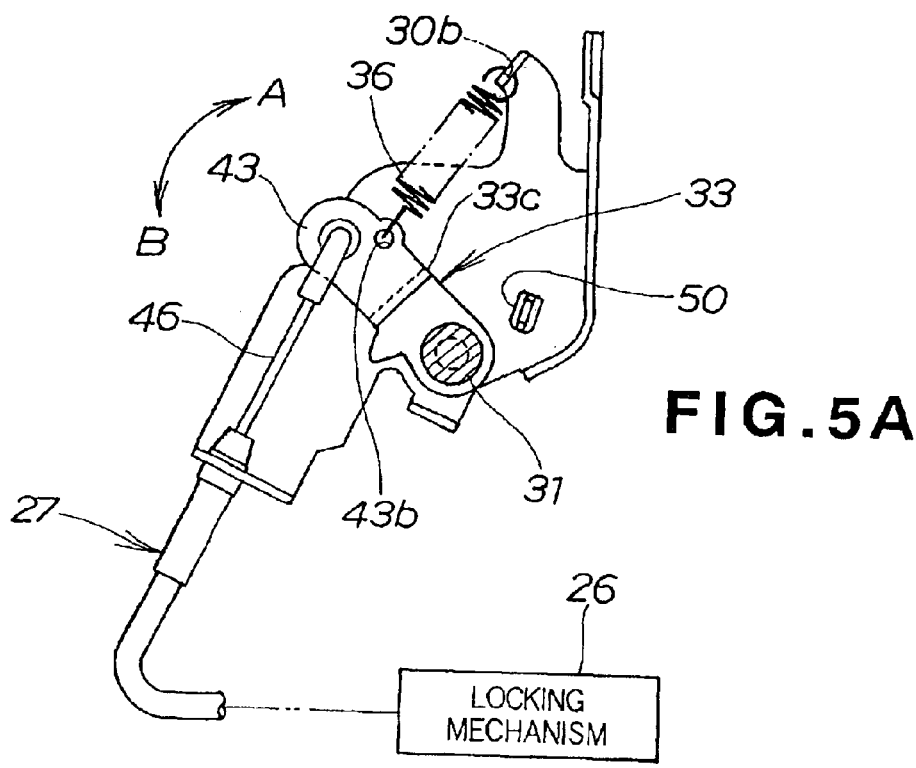
FIGS. 5A and 5B are views further explanatory of the opening rod mechanism in the fuel lid/slide door control apparatus of the invention.
Figure 5B:
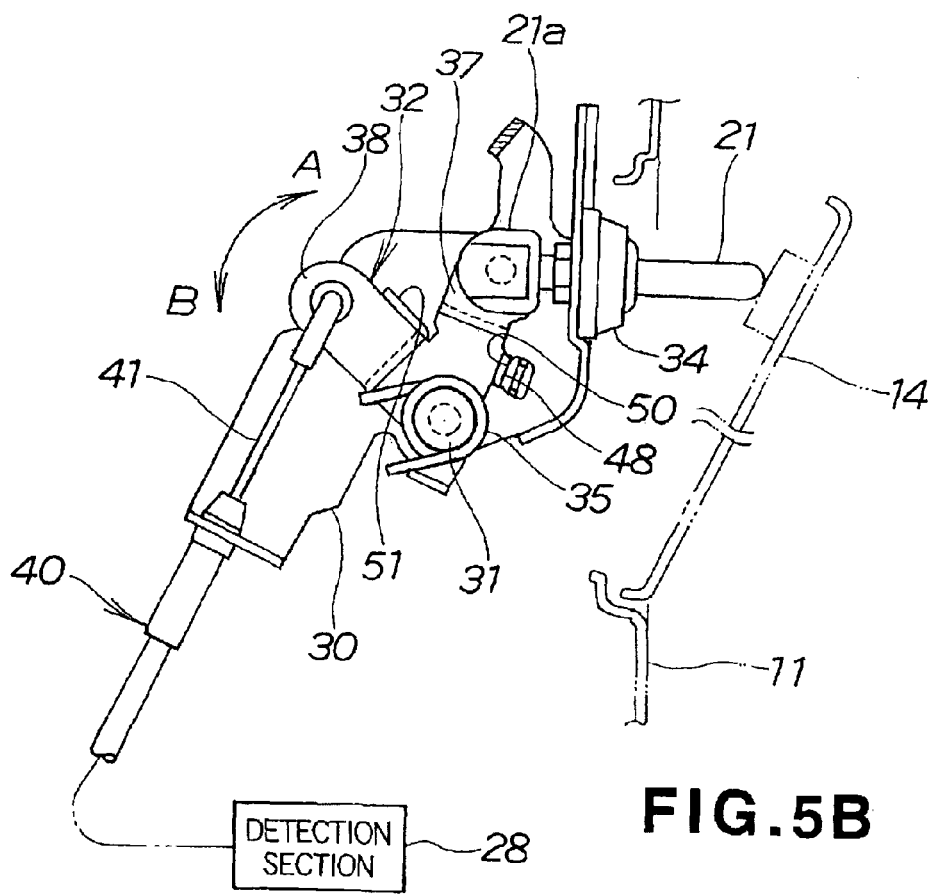

FIGS. 5A and 5B are views further explanatory of the opening rod mechanism 25 in the fuel lid/slide door control apparatus 20; more specifically, FIG. 5A is explanatory of the second pivot lever 33 and FIG. 5B is explanatory of the first pivot lever 32.

Tension spring 36 has opposite ends engaged in an engaging hole 43b formed in the distal end portion 43 of the second pivot lever 33 (see also FIG. 4) and an engaging groove 30b formed in the bracket 30 (see also FIG. 4). By the biasing force of the tension spring 36 extending between the second pivot lever 33 and the bracket 30, the second pivot lever 33 is normally urged about the pivot shaft 31 in the clockwise direction denoted by arrow A.

Also, by the biasing force of the coil spring 35 mounted on the pivot shaft 31, the first pivot lever 32 is normally urged about the pivot shaft 31 in the clockwise direction denoted by arrow A.

As the biasing force of the coil spring 35 pivots the first pivot lever 32 in the clockwise direction as denoted by arrow A until a stopper 48 formed on a rear surface of the lever 32 abuts against an engaging portion 50 of the bracket 30, the opening rod 21 can be projected rearwardly into pressing contact with the fuel lid 14. Thus, the fuel lid 14 can be opened by the opening rod 21, and the opening of the fuel lid 14 is detected by the detection section 28.

Also, the second pivot lever 33 is normally urged by the tension spring 36 in the direction of arrow A so that an upper rear edge 33c of the lever 33 resiliently abuts against an engaging piece 51 of the first pivot lever 32. Thus, as the first pivot lever 32 is caused to pivot in the direction of arrow A, the second pivot lever 33 pivots in the direction of arrow A together with the first pivot lever 32. Thus, the locking mechanism 26 is shifted to a locking position to prevent opening of the slide door 13 of FIG. 2.

Further, as the opening rod 21 is retracted forward by closing movement of the fuel lid 14, the rod 21 causes the first pivot lever 32 to pivot in a direction of arrow B against the biasing force of the coil spring 35. At that time, the detection section 28 detects the closing of the fuel lid 14. Because the engaging piece 51 of the first pivot lever 32 abuts against the upper rear edge 33c of the second pivot lever 33 as mentioned above, the second pivot lever 33 pivots in the direction of arrow B together with the first pivot lever 32. Thus, the locking mechanism 26 is shifted to an unlocking position to permit opening of the slide door 13.

The locking mechanism 26 and the detection section 28 will be later described in more detail, and the reason why the first pivot lever 32 and second pivot lever 33 are constructed so that they can be operatively disconnected from each other will be detailed in relation to FIG. 8C and FIG. 12.

Referring back to FIG. 3, as the opening rod 21 projects rearward from the bearing 34, the stopper 48 of the first pivot lever 32 is brought into abutting engagement with the engaging portion 50 fitted over an protrusion 49 of the bracket 30 (see also FIG. 4). At that time, the upper rear edge 33c of the second pivot lever 33 abuts against the engaging piece 51 (see FIGS. 4 and 5) of the first pivot lever 32.

As the fuel lid 14 is closed under the above conditions, the fuel lid 14 retracts the opening rod 21 forward as denoted by a hollow arrow, so that the first pivot lever 32 pivots about the pivot shaft 31 in the counterclockwise direction denoted by arrow B. Namely, because the engaging piece 51 of the first pivot lever 32 abuts against the upper rear edge 33c of the second pivot lever 33 as mentioned above, the first and second pivot levers 32 and 33 pivot together about the pivot shaft 31 in the direction of arrow B.

Once the fuel lid 14 is released from the locked state when the lid 14 is in the closed position, the first pivot lever 32 is caused to pivot about the pivot shaft 31 in the clockwise direction, as denoted by arrow A, by the biasing force of the coil spring 35, so that the opening rod 21 can be projected rearward. At that time, the second pivot lever 33 also pivots about the pivot shaft 31 in the clockwise direction, as denoted by arrow A, by the biasing force of the tension spring 36. Namely, the second pivot lever 33 pivots about the pivot shaft 31 in the clockwise direction together with the first pivot lever 32.

Figure 6:
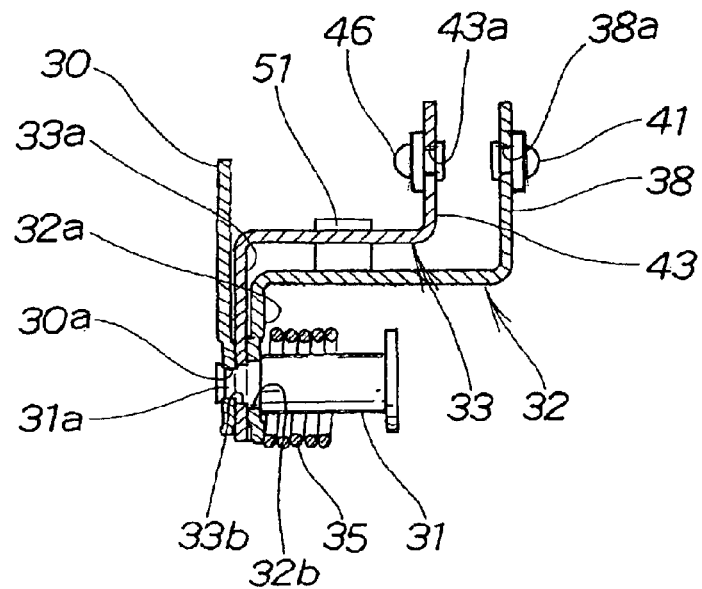
FIG. 6 is a sectional view taken along the 6—6 line of FIG. 3.

FIG. 6 is a sectional view taken along the 6—6 line of FIG. 3.

As shown in FIG. 6, the first pivot lever 32 is bent into a crank-like shape, and the distal end portion 31a of the pivot shaft 31 is inserted through the mounting hole 32b formed in the proximal end portion 32a of the first pivot lever 32. Similarly, the second pivot lever 33 is bent into a crank-like shape, and the distal end portion 31a of the pivot shaft 31 is also inserted through the mounting hole 33b formed in the proximal end portion 33a of the second pivot lever 33. The distal end portion 31a of the pivot shaft 31 is also inserted in the mounting hole 30a of the bracket 30. Namely, the distal end portion 31a of the pivot shaft 31 extends, through the mounting hole 32b of the first pivot lever 32 and mounting hole 33b of the second pivot lever 33, into the mounting hole 30a of the bracket 30, so that the first and second pivot levers 32 and 33 are together pivotably connected to the bracket 30 by means of the pivot shaft 31.

The inner member 41 of the cable unit 40 is connected to the distal end portion 38 of the first pivot lever 32, and the inner member 46 of the coupling cable unit 27 is connected to the distal end portion 43 of the second pivot lever 33.

Figure 7:
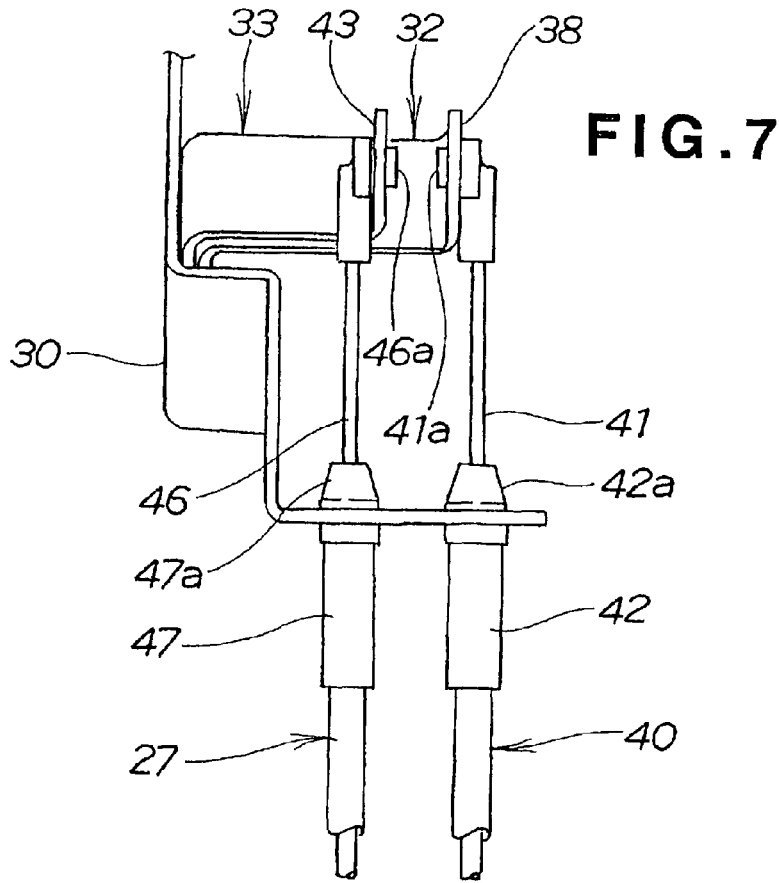
FIG. 7 is a view taken in a direction of arrow 7 of FIG. 3.

FIG. 7 is a view taken in a direction of arrow 7 of FIG. 3.

Outer tube 42 of the cable unit 40 connected to the distal end portion 38 of the first pivot lever 32 has a rear end portion 42a fixed to the bracket 30. Similarly, an outer tube 47 of the coupling cable unit 27 connected to the distal end portion 43 of the second pivot lever 33 has a rear end portion 47a fixed to the bracket 30.

Referring back to FIG. 3, the locking mechanism 26 includes a locking bracket 44 secured to the floor 15 (see also FIG. 2) of the vehicle body 11. The locking member 22 is connected via a pivot shaft 56 to the bracket 55 for pivotal movement between a locking position P1 and an unlocking position P2. Coil spring 57 is mounted on the pivot shaft 56 for normally urging the locking member 22 in a direction from the locking position P1 to the unlocking position P2.

The coupling unit (coupling cable unit) 27 includes the inner member 46 received in the outer tube 47 for axial movement along the inner surface of the tube 47, as also seen in FIG. 7. The inner member 46 has an elongated hole 45a formed in its front end portion 45, and a pin 58 projecting from the locking member 22 is engaged in the elongated hole 45a for movement relative to the longitudinal edge of the hole 45a. The inner member 46 is connected at the rear end pin 46a (see FIG. 7) to the distal end portion 43 of the second pivot lever 33.

Normally, the elongated hole 45a formed in the front end portion 45 of the coupling cable unit 27 is positioned so that its front end surface 45b abuts against the projecting pin 58 of the locking member 22. Thus, even when the locking member 22 is locked in the locking position P1 to prevent forward movement of the projecting pin 58, the inner member 46 of the coupling cable unit 27, connected to the second pivot lever 33, is allowed to move forward by the distance or stroke L.

The reason why the elongated hole 45a is formed in the front end portion 45 of the inner member 46 will be explained in detail in relation to FIGS. 9 and 13.

The detection section 28 is in the form of a sensor connected to the distal end portion 38 of the first pivot lever 32 via the inner member 41 of the cable unit 40. The sensor 28 is coupled to the opening rod 21 via the cable unit 40 and first pivot lever 32.

Thus, the detection section 28 detects the rearward projected state of the opening rod 21, i.e. the open state of the fuel lid 14, so that an electric circuit 61 for opening or closing the slide door 12 is turned off in response to a projected-rod detection signal output from the detection section 28. Therefore, when the fuel lid 14 is in the open position, the slide door 13 can be reliably prevented from being opened by electric power.

As the fuel lid 14 is closed, the opening rod 21 is shifted from the rearward projected position to the retracted position, and the sensor 28 detects the retracted state of the opening rod 21, i.e. closing of the fuel lid 14, so that the electric circuit 61 is turned on in response to a retracted-rod detection signal output from the detection section 28. Therefore, when the fuel lid 14 is in the closed position, the slide door 13 can be opened by electric power.

In short, the fuel lid/slide door control apparatus 20 of FIGS. 3 to 7, which includes the opening rod 21 for opening the fuel lid 14 and the locking member 22 for locking the slide door 13, is arranged to prevent the opening of the slide door 13 by means of the locking member 22 while the fuel lid 14 is open with the opening rod 21 projected rearward. But, while the fuel lid 14 is closed with the opening rod 21 retracted forward, the control apparatus 20 permits the opening of the slide door 13 by shifting the locking member 22 to the unlocking position P2.

Further, in the fuel lid/slide door control apparatus 20, the first and second pivot levers 32 and 33 are provided between the opening rod 21 and the locking member 22, in interlocked relation to each other, with the first and second pivot levers 32 and 33 connected to the opening rod 21 and locking member 22, respectively, and with the second pivot lever 33 pressed against the first pivot lever 32 via the tension spring 36. In addition, the sensor 28 is connected to the first pivot lever 32 for detecting the projected and retracted positions of the opening rod 21. As the opening rod 21 is retracted forward, the second pivot lever 33 is pressed by the engaging piece 51 of the first pivot lever 32 so that the second pivot lever 33 can move together with the first pivot lever 32, while, as the opening rod 21 is projected rearward, the second pivot lever 33 can move together with the first pivot lever 32 by the biasing force of the tension spring 36.

The first and second pivot levers 32 and 33 are pivotably supported together at their proximal ends by the same pivot shaft and pressed against each other via the engaging piece 51 by the biasing force of the tension spring 36. Because the opening rod 21 and locking member 22 are operatively connected with each other through a simple construction comprising only the two pivot levers 32 and 33 and the engaging piece 51 provided on the first pivot lever 32, the fuel lid/slide door control apparatus 20 can be significantly simplified in construction and reduced in size and cost. Further, because the second pivot lever 33 can be caused to move through a simple construction comprising the coupling cable unit 27 with the elongated hole 45a, the fuel lid/slide door control apparatus of the invention can be further reduced in size and cost.

Figure 8A:
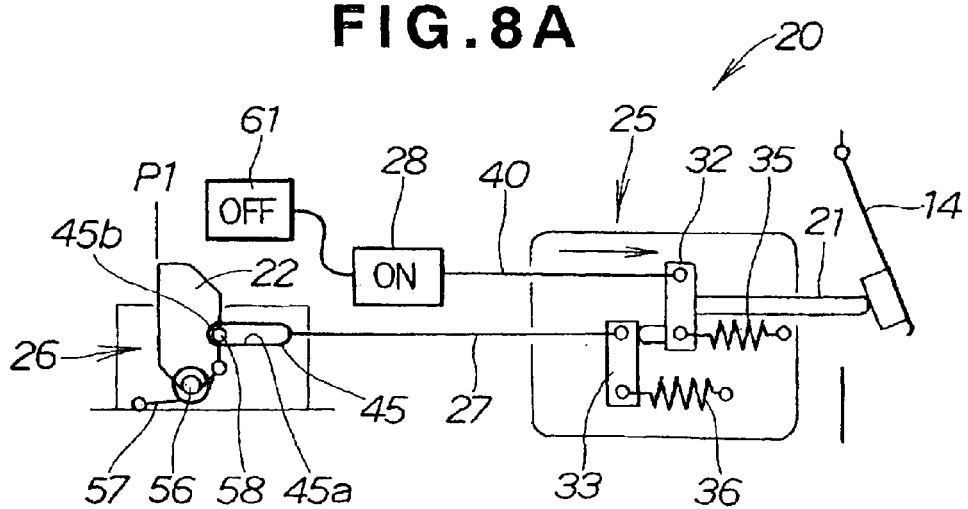
FIGS. 8A to 8C are views explanatory of behavior of the fuel lid/slide door control apparatus of the invention.
Figure 8B:
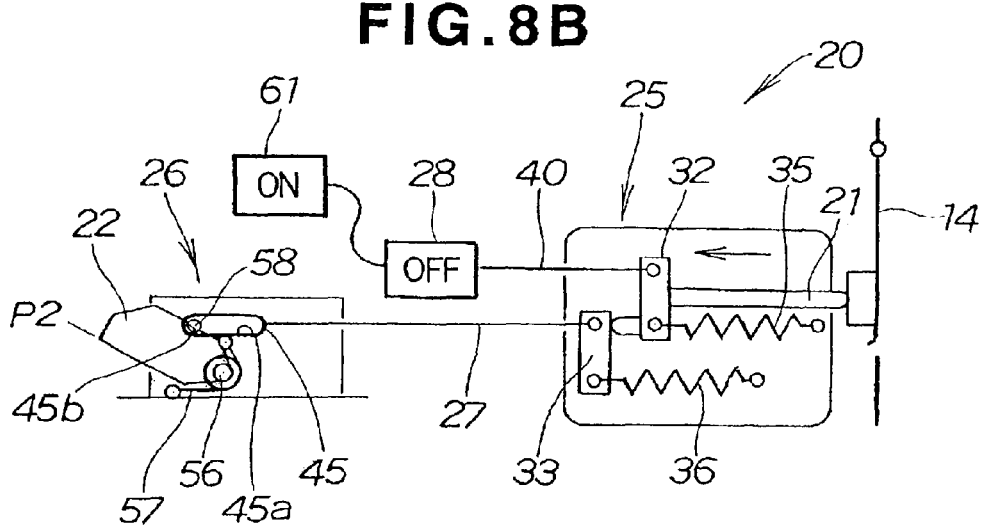

Next, operation of the fuel lid/slide door control apparatus 20 will be described with reference to FIGS. 8 to 13. Note that, to facilitate understanding, the first and second pivot levers 32 and 33 are illustrated in FIGS. 8A to 9B in much simplified form and the coil spring 35 is illustrated as a simple tension spring. FIGS. 8A to 8C are a first group of schematic views explanatory of behavior of the fuel lid/slide door control apparatus 20.

Specifically, FIG. 8A illustrates the fuel lid/slide door control apparatus 20 when the fuel lid 14 is opened under proper conditions. Namely, the fuel lid 14 is opened, by the first pivot lever 32 being moved rearward in an arrowed direction via the biasing force of the spring 35 to thereby cause the opening rod 21 to project rearward.

At that time, the sensor 28 detects the opening of the fuel lid 14, so that the electric circuit 61 for opening or closing the slide door 13 of FIGS. 1 and 2 is turned off. Therefore, when the fuel lid 14 is in the open position, the slide door 13 can be reliably prevented from being opened by electric power.

In the meantime, the second pivot lever 33 moves in the arrowed direction together with the first pivot lever 32 via the biasing force of the tension spring 36. Thus, the locking member 22 of the locking mechanism 26 is caused to pivot upward to the locking position P1 via the coupling cable unit 27, against the biasing force of the coil spring 57, so that the slide door 13 can not be opened even with manual force.

FIG. 8B illustrates the fuel lid/slide door control apparatus 20 when the fuel lid 14 is closed under proper conditions. As the opening rod 21 is retracted forward by the closing movement of the fuel lid 12, the first pivot lever 32 is moved in an arrowed direction against the biasing force of the spring 35.

At that time, the sensor 28 detects the closing of the fuel lid 14, so that the electric circuit 61 for opening or closing the slide door 13 is turned on. Therefore, when the fuel lid 14 is in the closed position, the slide door 13 can be opened with electric power.

In the meantime, the second pivot lever 33 moves in the arrowed direction together with the first pivot lever 32 against the biasing force of the tension spring 36. Thus, the locking member 22 of the locking mechanism 26 is caused to pivot downward to the unlocking position P2 by the biasing force of the coil spring 57, so that the slide door 13 can be opened even with manual force.

Figure 8C:
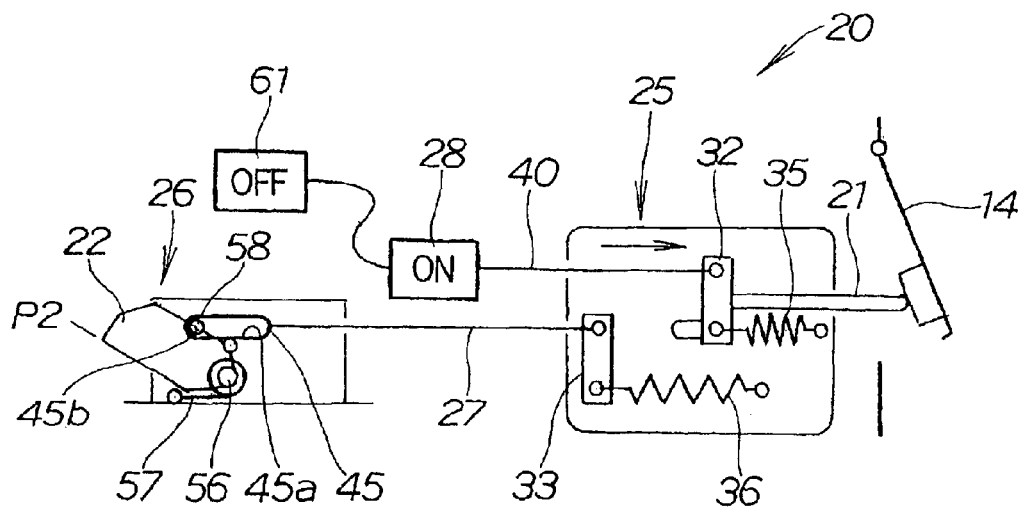

FIG. 8C illustrates the fuel lid/slide door control apparatus 20 when the fuel lid 14 is opened with the locking member 22 frozen held in the downwardly-pivoted or unlocking position. In the instant embodiment, the first and second pivot levers 32 and 33 are detachably coupled with each other, so that, as the fuel lid 14 is released from the locked state when it is in the closed position, the fuel lid 14 can be opened by the first pivot lever 32 being moved rearward in an arrowed direction via the biasing force of the spring 35 to thereby cause the opening rod 21 to project rearward.

At that time, the sensor 28 detects the opening of the fuel lid 14, so that the electric circuit 61 for opening or closing the slide door 13 is turned off. Therefore, when the fuel lid 14 is in the open position, the slide door 13 can be reliably prevented from being opened by electric power.

During the time, although the second pivot lever 33 is urged, via the biasing force of the tension spring 36, to move in the arrowed direction together with the first pivot lever 32, it remains still because the locking member 22 is frozen held in the downwardly-pivoted position.

Figure 9A:
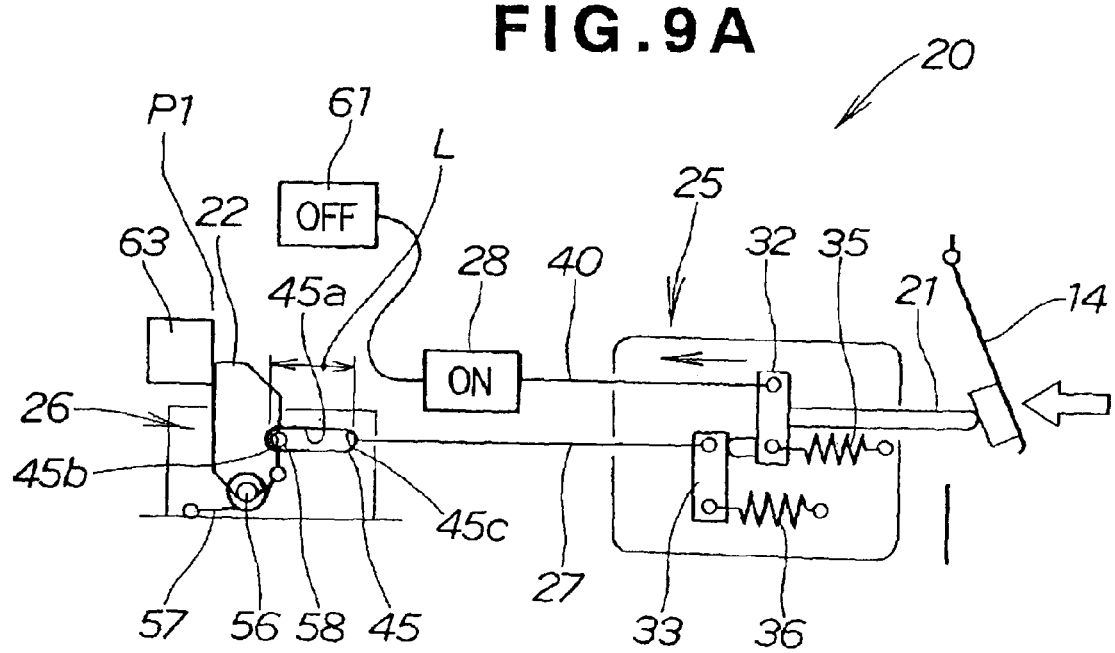
FIGS. 9A and 9B are views explanatory of behavior of the fuel lid/slide door control apparatus of the invention.
Figure 9B:
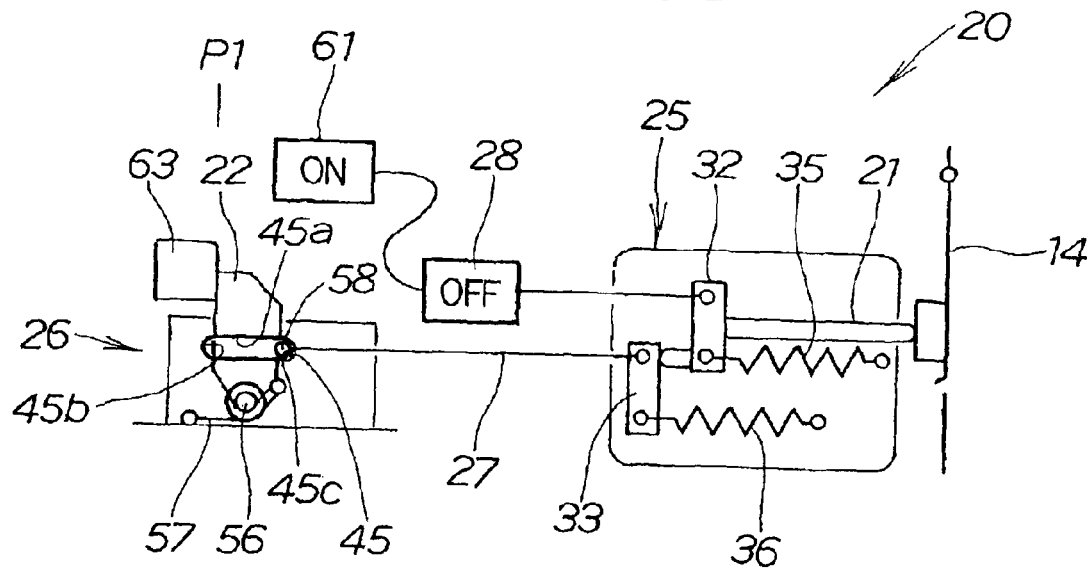

FIGS. 9A and 9B are a second group of schematic views explanatory of behavior of the fuel lid/slide door control apparatus 20.

Specifically, FIG. 9A illustrates the fuel lid/slide door control apparatus 20 when the fuel lid 14 is opened with the slide door 13 of FIG. 2 half opened. Namely, in some cases, the vehicle 10 is fueled with the slide door 13 in a half-opened position. In such cases, the locking member 22 is held in the locking position P1. As the slide door 13 is slid further open, a lower roller 63 of the slide door 13 abuts against the locking member 22 and thereby prevents the locking member 22 from pivoting downward from the locking position P1, so that the second pivot lever 33 is not allowed to move forward. Therefore, the first pivot lever 32 and hence the opening rod 21 are not allowed to move forward, which thus prevents the fuel lid 14 from being closed.

This is why the elongated hole 45a is formed in the front end portion 45 of the inner member 46 of the coupling cable unit 27. The projecting pin 58 of the locking member 22 is slidably fitted in the elongated hole 45a, and the pin 58 is normally held in contact with the front end surface 45b of the elongated hole 45a. Such arrangements allow the coupling cable unit 27 and hence the second pivot lever 33 to move forward even when the locking member 22 is prevented from pivoting downward from the locking position P1 to the unlocking position P2 (see FIG. 8). As a consequence, the opening rod 21 is allowed to move forward together with the first pivot lever 32, so that the fuel lid 14 can be closed even when the locking member 22 is held still in the locking position P1.

In FIG. 9B, the sensor 28 detects the closing of the fuel lid 14, so that the electric circuit 61 for opening or closing the slide door 13 is turned off. In this way, the slide door 13 can be slid by electric power in the direction where the roller 63 gets away from the locking member 22, i.e. in the direction where the door 13 is closed.

Figure 10A:
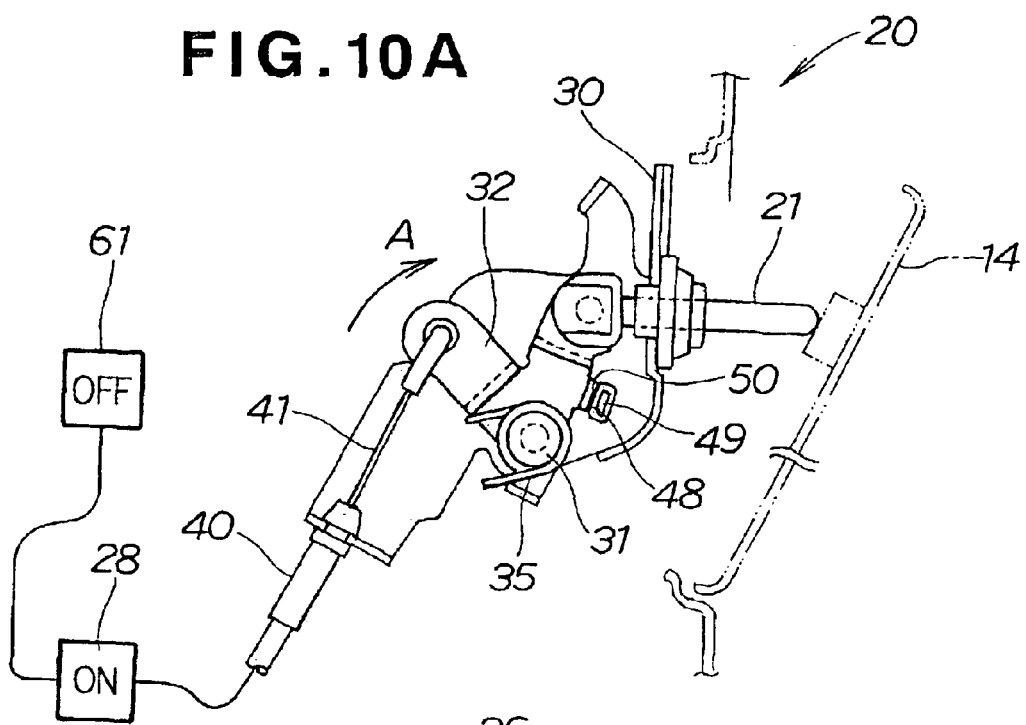
FIGS. 10A and 10B are views further explanatory of the behavior of the fuel lid/slide door control apparatus of the present invention.
Figure 10B:
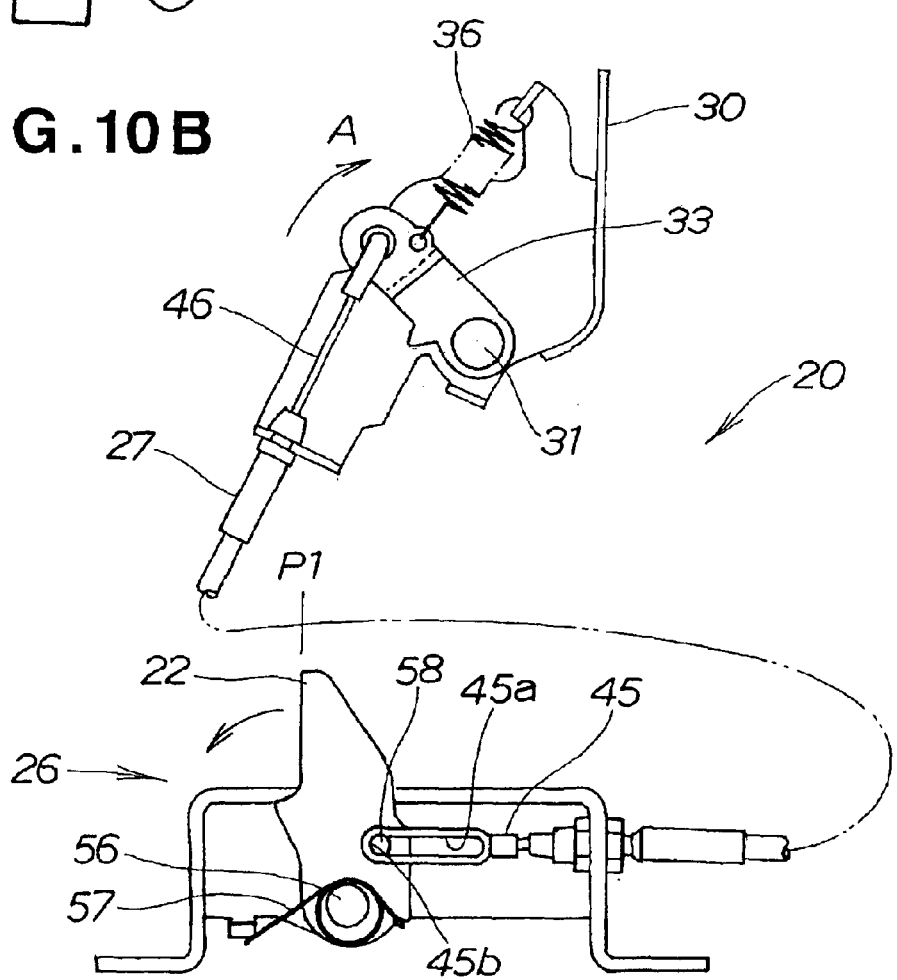

FIGS. 10A and 10B are views further explanatory of the behavior of the fuel lid/slide door control apparatus 20 of the present invention, which show a state where the fuel lid 14 has been opened under proper conditions as illustrated in FIG. 8B.

In this case, the first pivot lever 32 is caused to pivot in a direction of arrow A, by the biasing force of the coil spring 35, so that the stopper 48 of the pivot lever 32 abuts against the engaging portion 50 of the bracket 30. Thus, the opening rod 21 projects rearward to push open the fuel lid 14. At that time, the sensor 28 detects the opening of the fuel lid 14, so that the electric circuit 61 is turned off. Therefore, when the fuel lid 14 is in the open position, the slide door 13 can be reliably prevented from being opened by electric power. In the meantime, the second pivot lever 33 moves in the direction of arrow A together with the first pivot lever 32 by the biasing force of the tension spring 36. Thus, the locking member 22 of the locking mechanism 26 is caused to pivot upward to the locking position P1 against the biasing force of the coil spring 57, so that the slide door 13 will not be opened even with manual force.

Figure 11A:
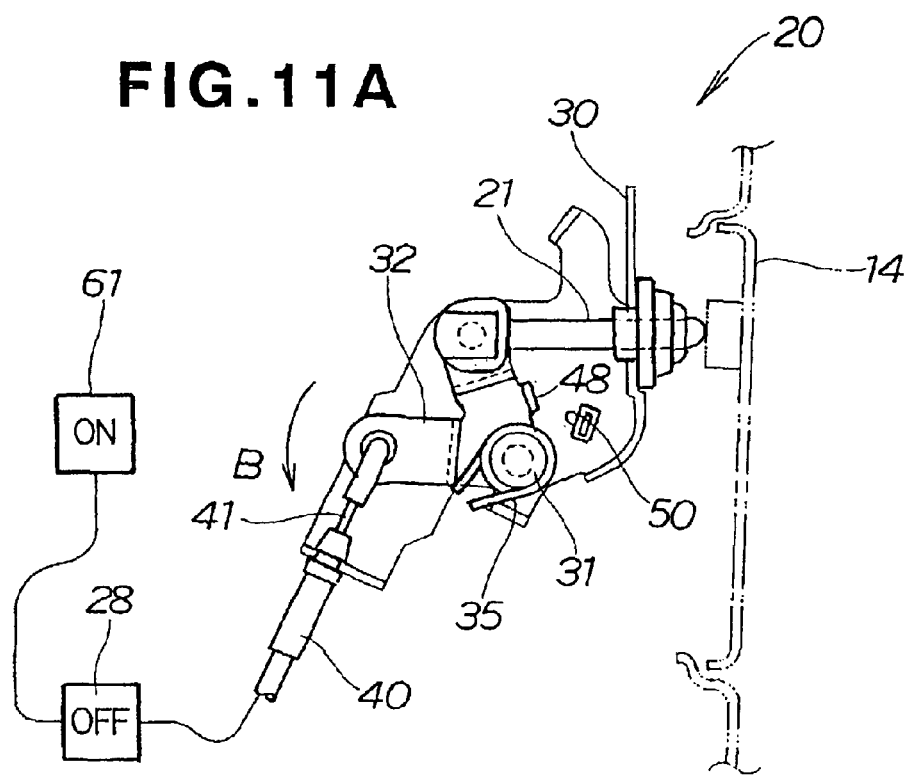
FIGS. 11A and 11B are views further explanatory of the behavior of the fuel lid/slide door control apparatus of the present invention.
Figure 11B:
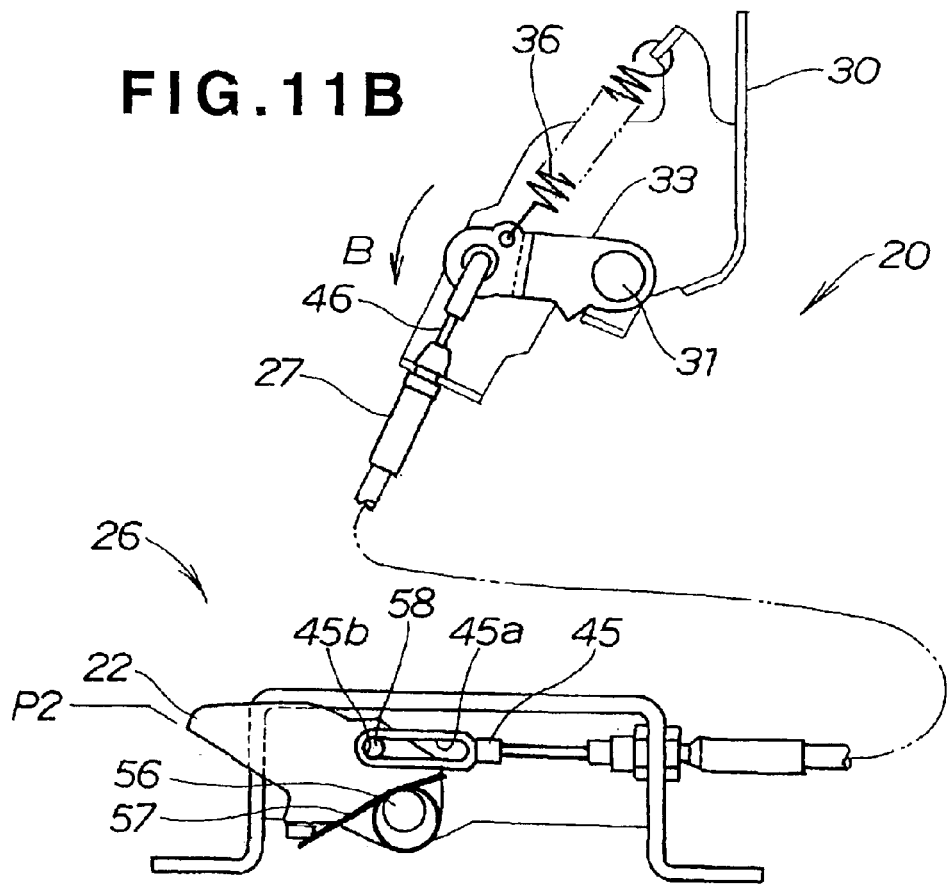

FIGS. 11A and 11B are views further explanatory of the behavior of the fuel lid/slide door control apparatus 20 of the present invention, which show a state where the fuel lid 14 has been closed under proper conditions as illustrated in FIG. 8B.

In this case, the opening rod 21 is retracted forward, so that the first pivot lever 32 is caused to pivot in a direction of arrow B together with the opening rod 21. At that time, the sensor 28 detects the closing of the fuel lid 14, so that the electric circuit 61 is turned on. Therefore, when the fuel lid 14 is in the closed position, the slide door 13 can be opened with electric power. During the time, the second pivot lever 33 moves in the direction of arrow B together with the first pivot lever 32 against the biasing force of the tension spring 36. Thus, the locking member 22 of the locking mechanism 26 is caused to pivot downward to the unlocking position P2 by the biasing force of the coil spring 57, so that the slide door 13 can be opened even with manual force.

Figure 12A:
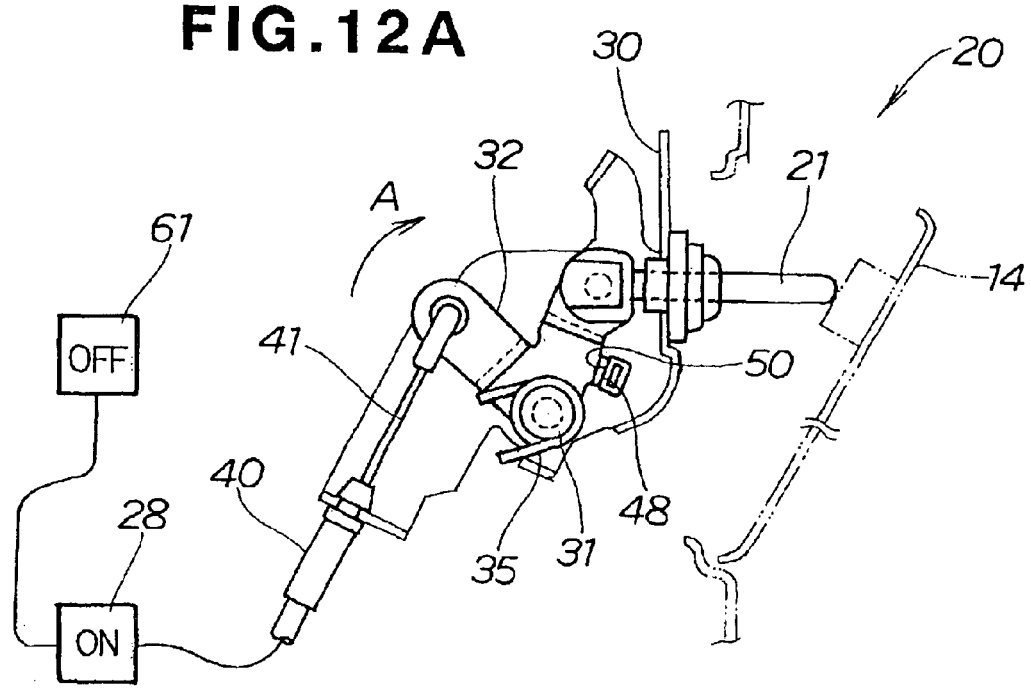
FIGS. 12A and 12B are views further explanatory of the behavior of the fuel lid/slide door control apparatus of the present invention.
Figure 12B:
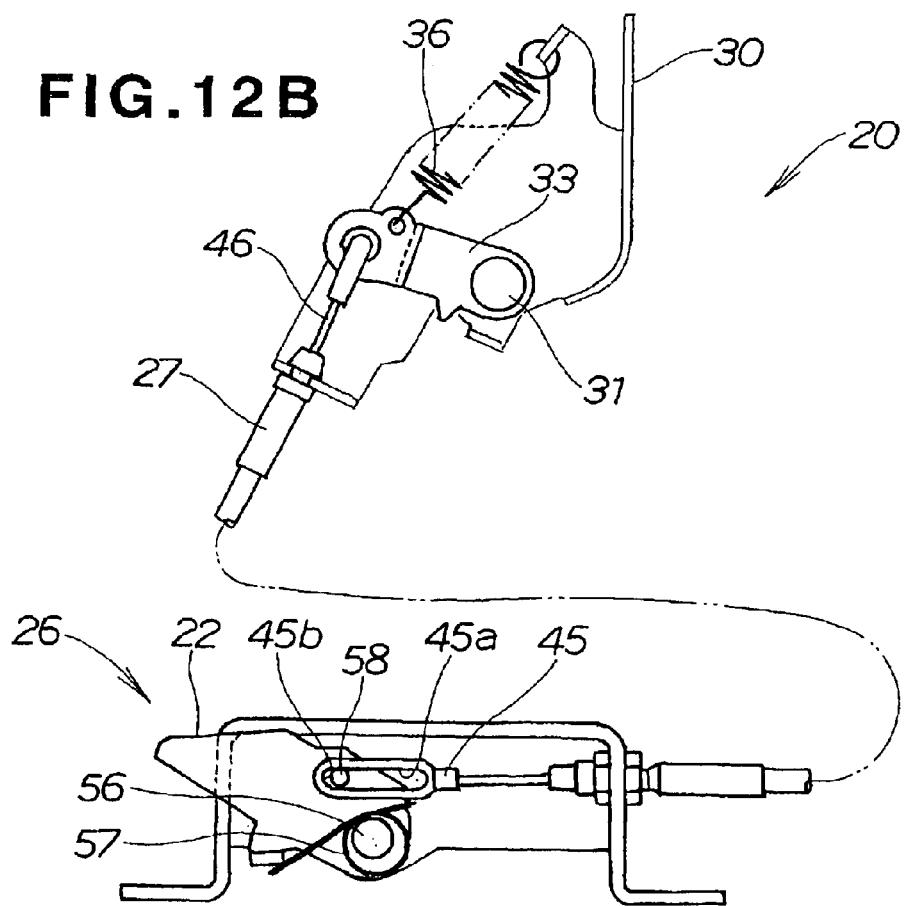

FIGS. 12A and 12B are views further explanatory of the behavior of the fuel lid/slide door control apparatus 20 of the present invention, which show a state where the fuel lid 14 has been opened with the locking member 22 frozen held in the downwardly-pivoted or unlocking position P2. As the fuel lid 14 is released from the locked state when it is in the closed position, the first pivot lever 32 is allowed to move, independently from the second pivot lever 33, in a direction of arrow A via the biasing force of the spring 35, by virtue of the disconnectable coupling between the first and second pivot levers 32 and 33. Thus, even when the locking member 22 is frozen held in the unlocking position P2, the fuel lid 14 can be opened by rearward projecting movement of the opening rod 21. At that time, the sensor 28 detects the opening of the fuel lid 14, so that the electric circuit 61 is turned off. Therefore, when the fuel lid 14 is in the open position, the slide door 13 can be reliably prevented from being opened by electric power. During the time, although the second pivot lever 33 is urged, via the biasing force of the tension spring 36, to move in the direction of arrow A together with the first pivot lever 32, it remains still because the locking member 22 is frozen held in the unlocking position P2.

Because the first and second pivot levers 32 and 33 are disconnectably coupled with each other, the first pivot lever 32 alone can be caused to pivot even when the locking member 22, frozen held in the unlocking position, does not permit pivoting movement of the second pivot lever 33, and such pivoting of the first pivot lever 32 can cause the opening rod 21 to project rearward so as to permit opening of that the fuel lid 14.

The sensor 28 can detect both the projected state of the opening rod 21 (i.e., opened state of the fuel lid 14) and the retracted state of the opening rod 21 (i.e., closed state of the fuel lid 14). Thus, the slide door 13 can be moved by electric power in response to detection, by the sensor 28, of the retracted state of the opening rod 21 (i.e., dosed state of the fuel lid 14).

Figure 13A:
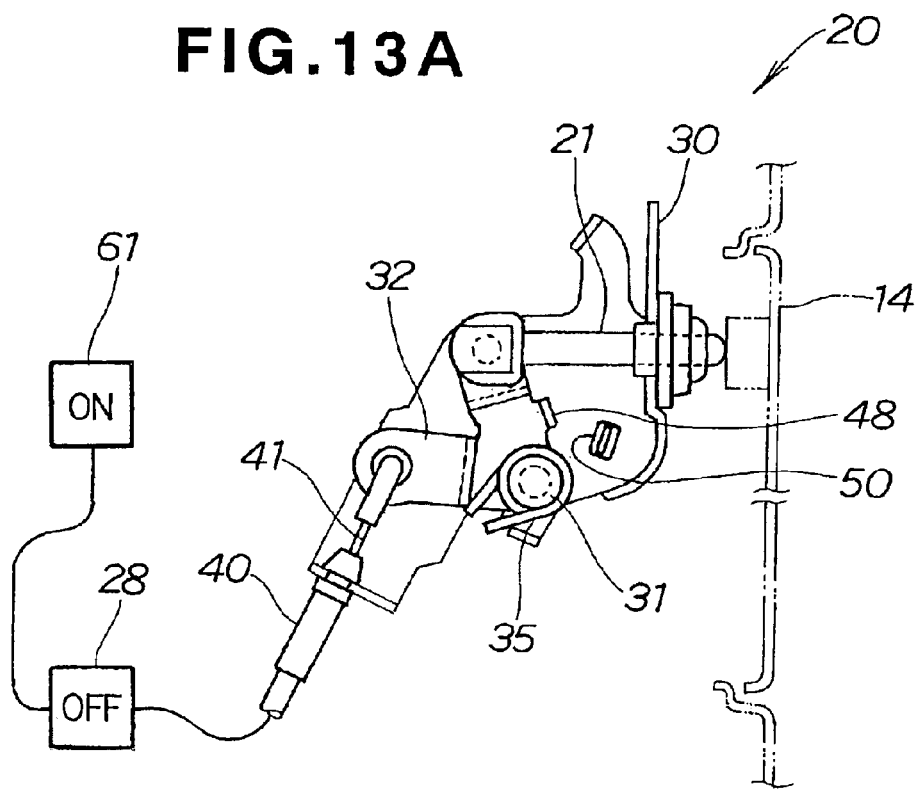
FIGS. 13A and 13B are views further explanatory of the behavior of the fuel lid/slide door control apparatus of the present invention.
Figure 13B:
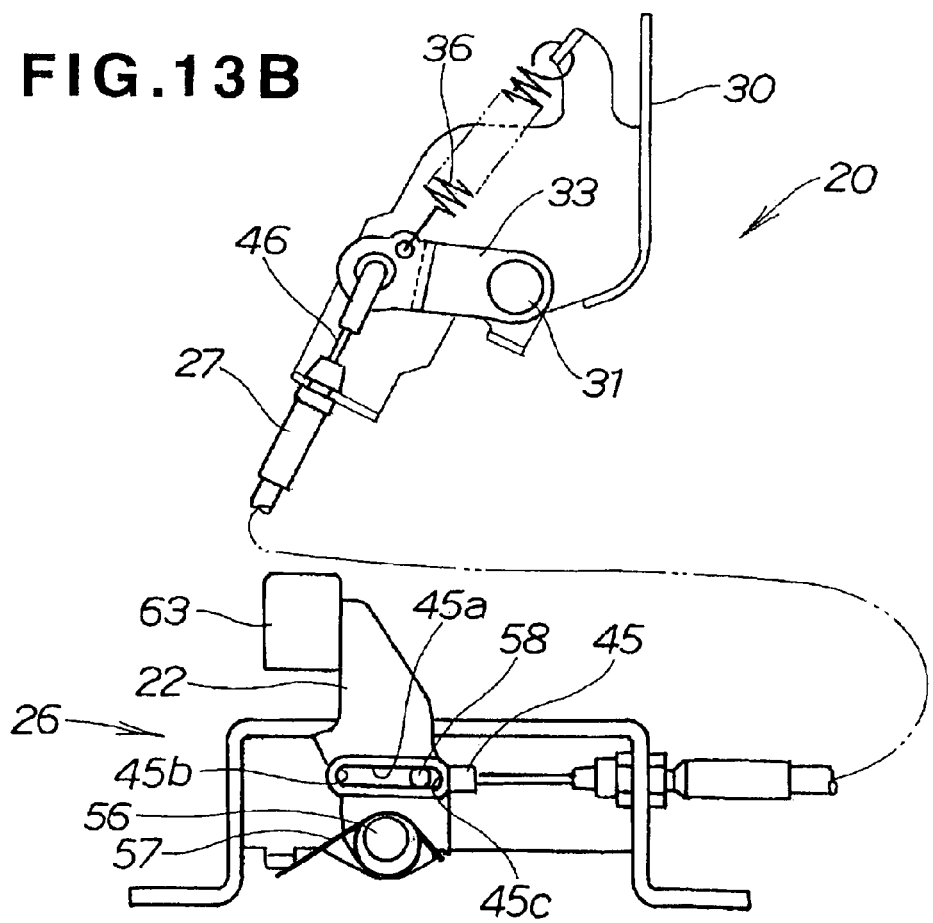
Figure 14:
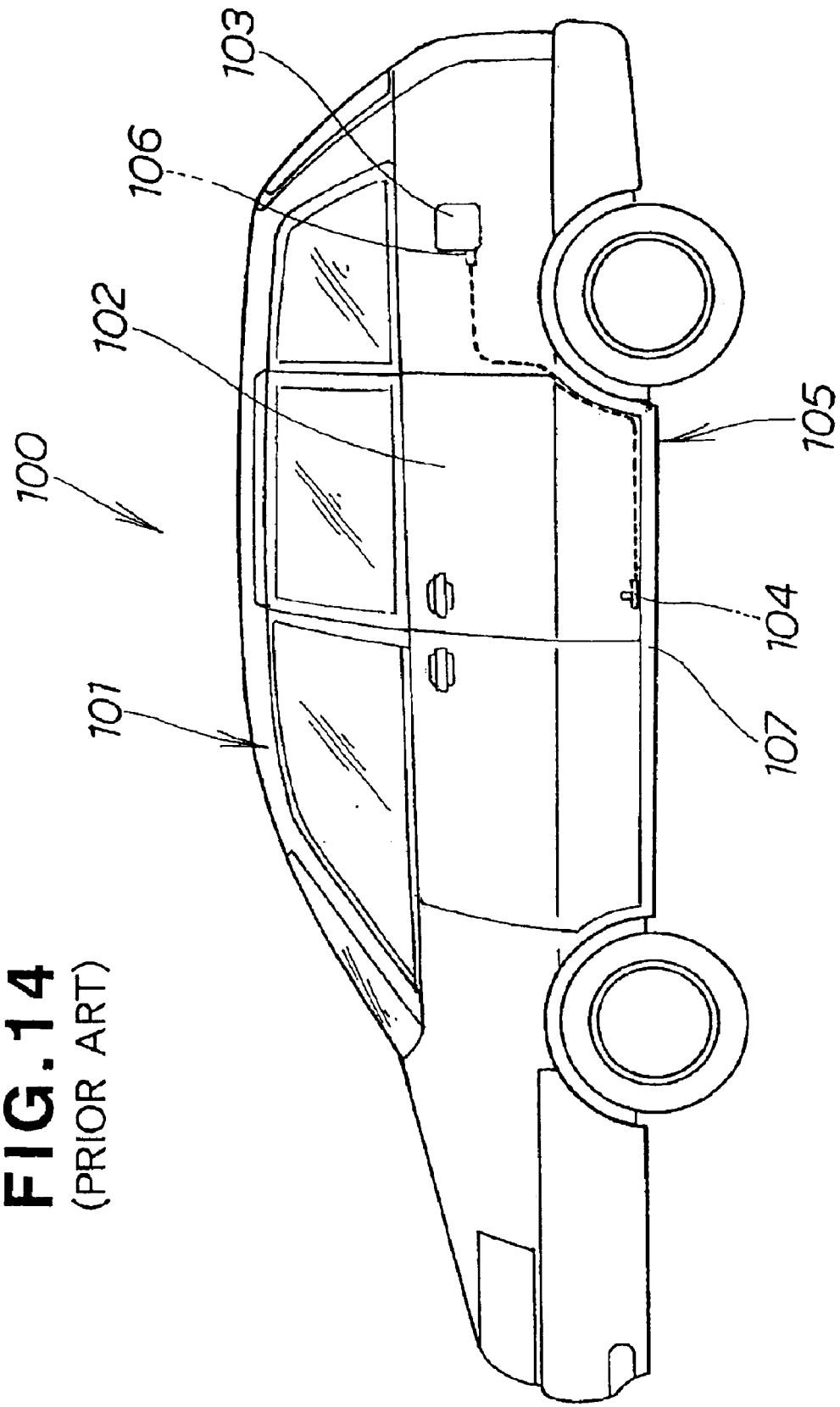
FIG. 14 is a side view of a vehicle including a conventional fuel lid/slide door control apparatus.

FIGS. 13A and 13B are views further explanatory of the behavior of the fuel lid/slide door control apparatus 20 of the present invention, which show a state where the fuel lid 14 has been opened with the slide door 13 of FIG. 2 half opened as illustrated in FIGS. 9A and 9B.

As illustrated in FIG. 3, the elongated hole 45a is formed in the front end portion 45 of the inner member 46 of the coupling cable unit 27, and the projecting pin 58 of the locking member 22 is normally held in contact with the front end surface 45b of the elongated hole 45a. Thus, even when the projecting pin 58 is being held still, such arrangements allow the coupling cable unit 27 to move forward by the distance L, so that the second pivot lever 33 can move forward. As a consequence, the opening rod 21 is allowed to move forward together with the first pivot lever 32, and thus the fuel lid 14 can be closed properly.

In the meantime, the sensor 28 detects the closing of the fuel lid 14, so that the electric circuit 61 is turned off. In this way, the slide door 13 can be slid in the direction where the roller 63 gets away from the locking member 22, i.e. in the direction where the door 13 is closed.

It should be appreciated that the tension spring 36 may be replaced with a compression spring or any other suitable resilient member.

Further, whereas the preferred embodiment of the present invention has been described above in relation to the case where the first and second pivot levers 32 and 33 are used, such first and second pivot levers 32 and 33 may be replaced with moving members of any other suitable type, like the linearly-moving members as illustratively shown in FIGS. 8A to 9B.

Furthermore, the locking member 22 employed in the above-described embodiment may be of any other desired shape than that illustrated in FIG. 3.

In summary, the control apparatus of the invention is characterized in that the first moving member and second moving member are provided between the opening rod and the locking member for interlocked movement with respect to each other and in that, as the opening rod is retracted by the closing movement of the fuel lid, the second moving member is pressed by the first moving member to move in the first direction together with the first moving member, while, as the opening rod is projected, the second moving member is caused to move, in the second direction opposite to the first direction, together with the first moving member by the biasing force of the resilient member. Thus, even in the case where the locking member is frozen held in the unlocking position to place the second moving member in locked condition, the arrangements of the present invention allow the opening rod to project so as to open the fuel lid.

The control apparatus of the invention is also characterized by including the detection section connected to the first moving member for detecting the projected state and retracted state of the opening rod. Because the first moving member moves together with the opening rod when the rod is projected to open the fuel lid, the detection section, connected to the first moving member, can detect the opening of the fuel lid. Thus, in the case where the fuel lid has been opened with the locking member frozen held in the unlocking position, the opening of the fuel lid can be detected by the detection section, and, on the basis of the detection signal of the detection section, the slide door can be prevented from being opened by electric power.

Obviously, various minor changes and modifications of the present invention are possible in the light of the above teaching. It is therefore to be understood that within the scope of the appended claims the invention may be practiced otherwise than as specifically described.

What is claimed is:

1. A control apparatus for a fuel lid and slide door including an opening rod for opening the fuel lid, and a locking member for locking the slide door, wherein, when the fuel lid is opened by projecting movement of said opening rod, control is performed to prevent opening of the slide door by means of said locking member, but, when said opening rod is retracted by closing movement of the fuel lid, control is performed to permit opening of the slide door by shifting said locking member to an unlocking position, said control apparatus comprising:

a first moving member and second moving member provided between said opening rod and said locking member for interlocked movement with respect to each other, said first moving member being connected to said opening rod, said second moving member being connected to said locking member via a coupler unit, said second moving member being pressed against said first moving member via a resilient member; and a detection section connected to said first moving member for detecting a projected state and retracted state of said opening rod, wherein, as said opening rod is retracted by the closing movement of the fuel lid, said second moving member is pressed by said first moving member, connected to said opening rod, to move in a first direction together with said first moving member, but, as said opening rod is projected, said second moving member is caused to move, in a second direction different from the first direction, together with said first moving member by a biasing force of said resilient member.

2. A control apparatus as claimed in claim 1 wherein said first moving member and second moving member are a first pivot lever and second pivot lever, said first pivot lever and second pivot lever are pivotably supported together at their respective proximal ends via a pivot shaft, and said second pivot lever is pressed against an engaging piece of said first pivot lever by the biasing force of said resilient member.

3. A control apparatus as claimed in claim 1 wherein said coupler unit has an elongated hole formed in an end portion thereof, and said locking member has a projecting pin fitted in the elongated hole of said coupler unit in such a manner that said coupler unit is movable relative to said locking member in a longitudinal direction of the elongated hole, whereby said second moving member connected to said locking member via said coupler unit having the elongated hole is movable when said locking member is held in a locking position for locking said slide door.

* * * * *